US006179495B1

(12) United States Patent
Sugata et al.

(10) Patent No.: US 6,179,495 B1
(45) Date of Patent: Jan. 30, 2001

(54) PHOTOSENSITIVE MATERIAL DISCHARGING APPARATUS

(75) Inventors: Yoshihisa Sugata; Kenji Todoki, both of Wakayama (JP)

(73) Assignee: Noritsu Koki Co., Ltd., Wakayama (JP)

(*) Notice: Under 35 U.S.C. 154(b), the term of this patent shall be extended for 0 days.

(21) Appl. No.: 09/327,050

(22) Filed: Jun. 7, 1999

(30) Foreign Application Priority Data

Jun. 15, 1998 (JP) .................................................. 10-166666

(51) Int. Cl.[7] ........................................................ G03D 3/08
(52) U.S. Cl. ........................ 396/612; 271/286; 271/298; 355/27
(58) Field of Search .................................. 396/612, 616, 396/617, 620; 355/27–29; 271/286, 267, 298–300

(56) References Cited

U.S. PATENT DOCUMENTS

| 4,796,878 | * | 1/1989 | Nichelson et al. | 271/121 |
| 5,139,247 | * | 8/1992 | Meschi | 270/32 |
| 5,193,423 | | 3/1993 | Bakker | 83/24 |
| 5,446,520 | | 8/1995 | Todoki | 355/27 |
| 5,724,626 | | 3/1998 | Todoki | 396/612 |

FOREIGN PATENT DOCUMENTS

| 427324A1 | 5/1991 | (EP) . |
| 629915A2 | 12/1994 | (EP) . |

* cited by examiner

*Primary Examiner*—D. Rutledge
(74) *Attorney, Agent, or Firm*—Fulbright & Jaworski, LLP

(57) ABSTRACT

A photosensitive material discharging apparatus includes a discharge roller pair 41, 43 disposed in an outlet for discharging for a photosensitive material, and a plurality of transport roller pairs 70a, 70b arranged on a transport path upstream of the discharge roller pair. The discharge roller pair has a first roller 41 rotatable at a higher peripheral speed than the transport roller pairs, and a second roller 43 disposed to pinch the photosensitive material with the first roller. The second roller is freely rotatable to cause slippage between the first roller and the photosensitive material when the photosensitive material is pinched by both transport roller pairs and discharge roller pair, and to allow the photosensitive material to be transported reliably by drive of the first roller when the photosensitive material is pinched only by the discharge roller pair.

4 Claims, 5 Drawing Sheets

PHOTOSENSITIVE MATERIAL DISCHARGING APPARATUS

BACKGROUND OF THE INVENTION

1. Field of the Invention

This invention relates to a photosensitive material discharging apparatus for transporting along a transport path and discharging a photosensitive material. More particularly, the invention relates to a photosensitive material discharging apparatus having a discharge section disposed downstream of a transport path for discharging a photosensitive material, a plurality of discharge roller pairs arranged in the discharge section for discharging the photosensitive material, and a plurality of transport roller pairs arranged on the transport path upstream of the discharge roller pairs.

2. Description of the Related Art

The above photosensitive material discharging apparatus is disclosed in U.S. Pat. No. 5,724,626, for example. The prior apparatus defines a transport path for transporting a photosensitive material emerging from a developing stage and a drying stage, to a loading conveyer for loading the material onto a sorter. This transport path includes a first transporting pinch roller mechanism having a plurality of pinch roller pairs, and a second transporting pinch roller mechanism disposed in an exit region of the transport path. The second pinch roller mechanism is capable of transporting the photosensitive material at a higher speed than the first pinch roller mechanism.

The pinch rollers constituting the first pinch roller mechanism are elongated rollers each extending perpendicular to a transport direction. The second pinch roller mechanism has large drive rollers, and small driven rollers opposed to the drive rollers, respectively. The drive rollers are mounted on roller shafts driven by a drive shaft through transmission gear mechanisms. Further, a torque limiter is disposed between a driven gear of each transmission gear mechanism and the roller shaft of each drive roller. The torque limiter is operable in response to a torque greater than a predetermined value to render the drive roller freely rotatable.

The photosensitive material introduced into this photosensitive material discharging apparatus is first transported by the first transporting pinch roller mechanism, at a transporting speed corresponding to a peripheral speed of the rollers of this roller mechanism, to a position adjacent an exit of the transport path. As the forward end of the photosensitive material advances into the second transporting pinch roller mechanism, the drive rollers of the second pinch roller mechanism would exert an effort to transport the material at a peripheral speed of the drive rollers. However, since the rear end of the photosensitive material is still engaged by the first transporting pinch roller mechanism, the torque limiters of the second transporting pinch roller mechanism operate to allow the photosensitive material to remain being transported at the transporting speed produced by the first transporting pinch roller mechanism. When the rear end of the photosensitive material is released from the first transporting pinch roller mechanism, the second transporting pinch roller mechanism accelerates the transport of the material to discharge it at high speed from the exit of the transport path.

The prior apparatus noted above has a disadvantage of requiring the torque limiters mounted in the second transporting pinch roller mechanism, which results in an increased cost. Moreover, where sheets of the photosensitive materials are discharged as a three-lane phase-staggered arrangement, the apparatus requires the number of torque limiters corresponding to the number of lanes. Then, the apparatus involves a very large cost. Where a plurality of torque limiters are used, variations among the torque limiters destabilize delivery of the sheets of the photosensitive material. This results in the sheets being discharged to varied, irregular positions.

SUMMARY OF THE INVENTION

This invention has been made having regard to the state of the art noted above, and its object is to provide a photosensitive material discharging apparatus which may be manufactured at reduced cost by dispensing with the torque limiters arranged at the photosensitive material outlet.

The above object is fulfilled, according to this invention, by a photosensitive material discharging apparatus for transporting along a transport path and discharging a photosensitive material, comprising a discharge section disposed downstream of the transport path for discharging the photosensitive material; a plurality of transport roller pairs arranged on the transport path upstream of the discharge section; and a discharge roller pair disposed in the discharge section for receiving the photosensitive material transported by the transport roller pairs and discharging the photosensitive material, the discharge roller pair having a first roller rotatable at a higher peripheral speed than the transport roller pairs, and a second roller disposed to pinch the photosensitive material with the first roller; wherein the second roller is freely rotatable to cause slippage between the first roller and the photosensitive material when the photosensitive material is pinched by both the transport roller pairs and the discharge roller pair, and to allow the photosensitive material to be transported by drive of the first roller when the photosensitive material is pinched only by the discharge roller pair.

With this construction, when the photosensitive material (e.g. photographic paper) is pinched by both the transport roller pair and discharging roller pair, the first roller of the discharge roller pair slips on a surface of the photosensitive material. Thus, no torque limiter is required, thereby contributing to a cost reduction.

In a preferred embodiment of this invention, the first roller is disposed to contact a back surface of the photosensitive material reverse to a front emulsion surface thereof. This feature is of advantage in that no damage is done to the emulsion surface on which images are formed.

In a further preferred embodiment of the invention, the first roller has a main roller body formed of plastic, and an element of high friction coefficient formed peripherally of the main roller body. This construction assures a reliable operation for discharging the photosensitive material.

In a further preferred embodiment of the invention, the second roller is supported by a support shaft vertically movable by a predetermined amount, the second roller contacting the first roller by gravity. This construction can absorb any load variations occurring while the photosensitive material is made to slip, to enhance the reliability of the discharging operation.

Other features and advantages of this invention will be apparent from the following description of an embodiment to be taken with reference to the drawings.

DESCRIPTION OF THE PREFERRED EMBODIMENT

Figure 1:
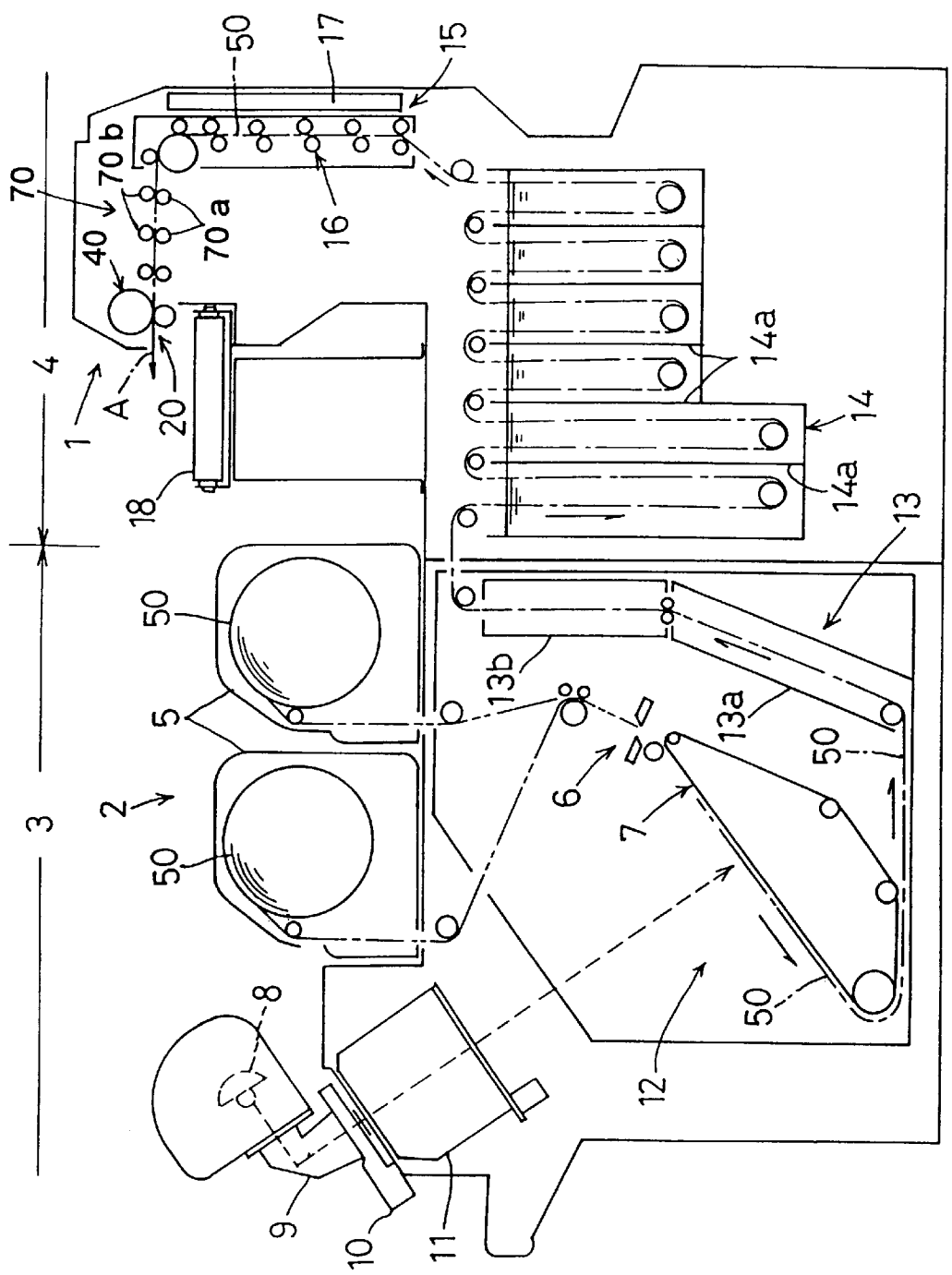
FIG. 1 is a schematic overall view of a photograph printing-developing system incorporating a photosensitive material discharging apparatus according to this invention.

FIG. 1 is a schematic overall view of a photographic printing-developing system 2 incorporating a photosensitive material discharging apparatus 1. The photographic printing-developing system 2 is divided into a printing-exposing region 3 and a developing region 4. The printing-exposing region 3 includes a projecting and exposing unit having a light source 8, a mirror tunnel 9, a negative mask 10 and a lens unit 11, and magazines 5 for storing rolls of a photosensitive material 50. The photosensitive material 50 drawn out of each magazine 5 is cut by a cutter 6 to a print size, and transported to an exposure point of the projecting and exposing unit by a suction belt 7 constituting part of a photosensitive material transporting device 12.

The transporting device 12 transports printed and exposed sheets of photosensitive material 50 in directions indicated by arrows to a distributing device 13. The distributing device 13 receives the sheets of photosensitive material 50 transported in series, and forwards the sheets in a three-lane, phase-staggered formation. For this purpose, the distributing device 13 includes a distributing unit 13a for distributing the sheets of photosensitive material 50, and a conveyer 13b for transporting the distributed sheets of photosensitive material 50 in a transport direction. In the distributing device 13, the sheets of photosensitive material 50 are arranged in the three-lane, phase-staggered formation having phase differences in the transport direction (i.e. staggered in the transport direction). Thus, the distributing unit 13a noted above has a movable table (not shown) for shifting the incoming sheets of photosensitive material 50 relative to one another in a direction normal to the transport direction.

The developing region 4 disposed downstream of the distributing device 13 includes a developing tank 14 for storing developers, a drying section 15, and the photosensitive material discharging apparatus 1. The developing tank 14 has an interior thereof divided by partitions 14a into several compartments. Each compartment stores a different type of developer needed for the developing process. As shown, the transport direction of photosensitive material 50 extends successively through the developers stored in the respective compartments.

The drying section 15 has a transport path defined by a plurality of transport roller pairs 16. A heater 17 is disposed on one side of this transport path. The sheets of photosensitive material 50 are dried while advancing along the transport path.

The dried sheets of photosensitive material 50 are subsequently introduced into the photosensitive material discharging apparatus 1. The photosensitive material discharging apparatus 1 has a transport path of photosensitive material 50 defined by a transporting pinch roller mechanism 70 including a plurality of transport roller pairs, and a discharging roller mechanism 16 having a plurality of discharge roller pairs, which will be described in detail later. This transport path extends from the above-noted drying section 15 to a loading conveyer 18 which receives the sheets of photosensitive material 50 discharged from the photosensitive material discharging apparatus 1.

Figure 2:
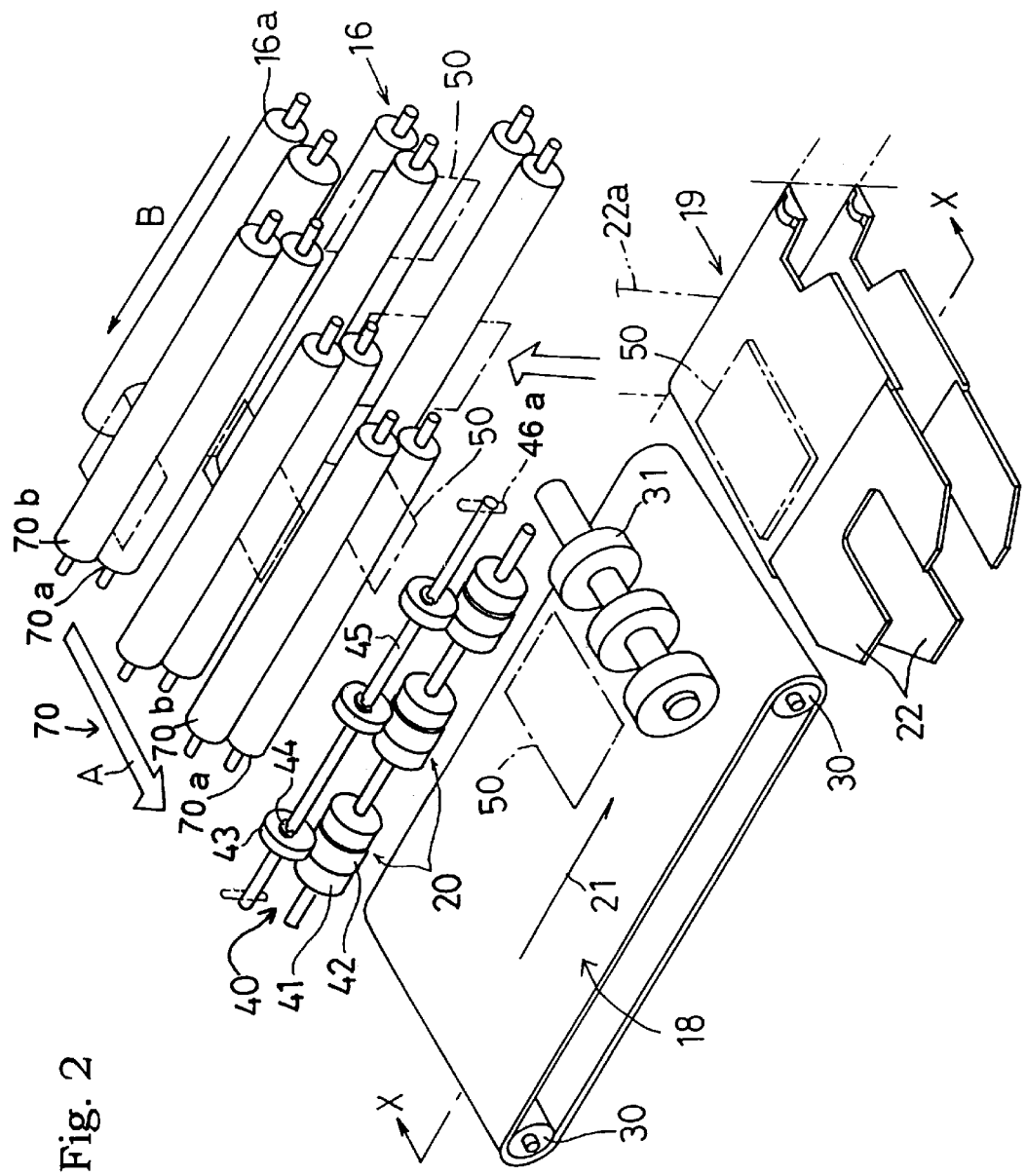
FIG. 2 is a perspective view of the photosensitive material discharging apparatus.
Figure 3:
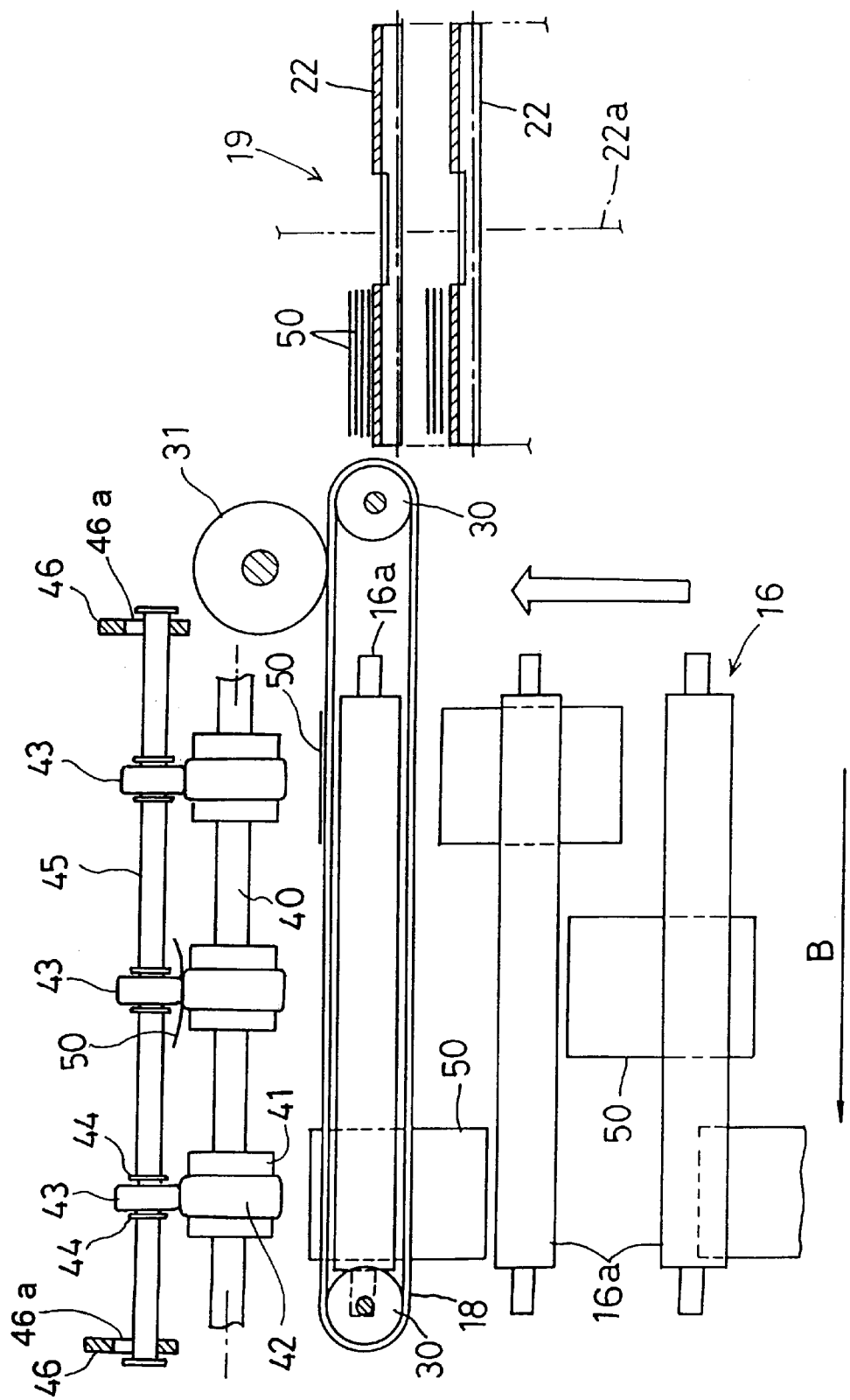
FIG. 3 is a section taken on line X—X of FIG. 2.

As seen from FIGS. 2 and 3, each transport roller pair of the transporting pinch roller mechanism 70 includes a drive roller 70a, and a pressing roller 70b opposed to the drive roller 70a for pinching the sheets of photosensitive material 50 therebetween. The drive roller 70a and pressing roller 70b are elongate rollers extending over an entire width of the photosensitive material transport path.

The discharging roller mechanism 40 is disposed at an exit (outlet) 20 of the transport path, and includes three discharge roller pairs arranged transversely of the transport direction. Each discharge roller pair has a large, first roller 41 acting as a drive roller. The first rollers 41 are driven at a higher peripheral speed than the drive rollers 70a of transporting pinch roller mechanism 70. The three first rollers 41 are fixed to a common support shaft 41a. The first rollers 41 are formed of plastic, with rubber elements 42 of high friction coefficient mounted peripherally thereof. The first rollers 41 are rotatable with the support shaft 41a driven by a motor not shown.

Small, second rollers 43 arranged to contact the rubber elements 42 from above are free rotation rollers. The three second rollers 43 are mounted on a support shaft 45. The second rollers 43 are formed separately from the support shaft 45, and are prevented from moving axially of the support shaft 45 by E-rings 44. The second rollers 43 are formed of metal. Opposite ends of the support shaft 45 are inserted into vertically extending slots 46a formed in brackets 46. Consequently, the support shaft 45, and thus the second rollers 43, are vertically movable toward and away from the first rollers 41. Specifically, the second rollers 43 are vertically movable by 2–3 mm. In a normal situation, the weight of second rollers 43 causes the support shaft 45 to contact lower ends of the slots 46a. That is, the second rollers 43 act as weight rollers to pinch, by gravity, the photosensitive material 50 with the first rollers 41, and apply a frictional force to the photosensitive material 50. The weight of the second rollers 43 is set to a value short of applying a frictional force strong enough to draw the photosensitive material pinched by transporting pinch roller mechanism 70.

Figure 5:
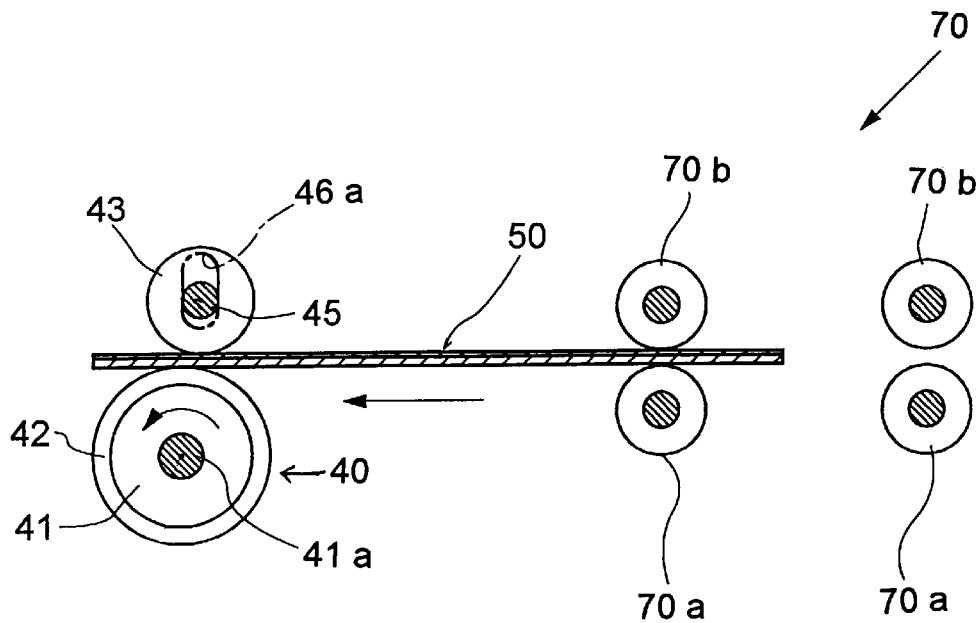
FIGS. 5A and 5B are views illustrating a photosensitive material discharging operation.
Figure 5:
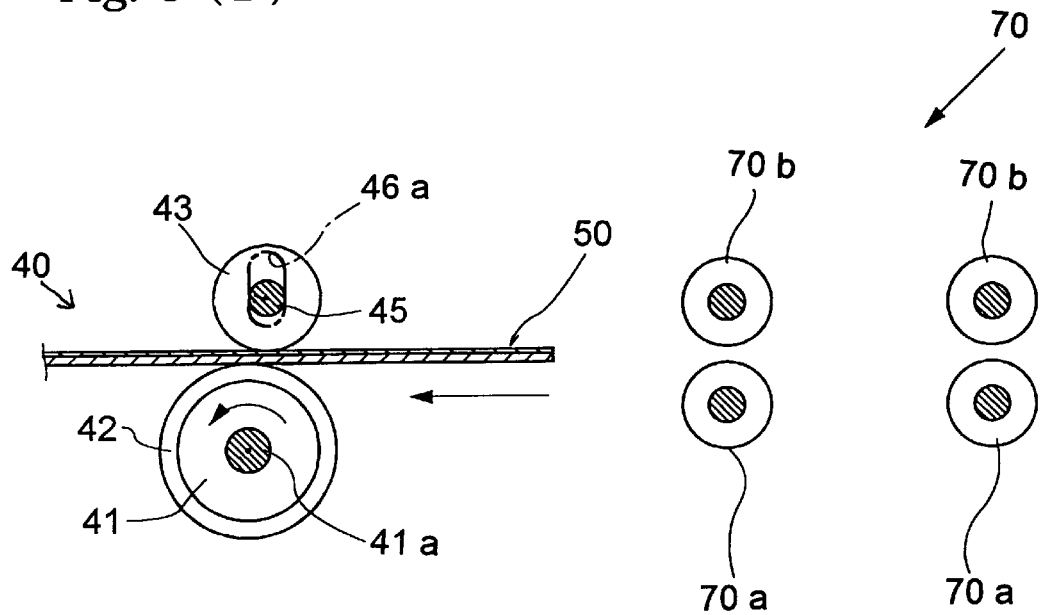

As expressly shown in FIGS. 5A and 5B, the first rollers 41 have a rotational axis thereof displaced downstream on the transport path from a rotational axis of the second rollers 43. This construction is effective to deliver the photosensitive material 50 in an appropriate direction, e.g. slightly upward.

As shown in FIGS. 2 and 3, the loading conveyer 18 is disposed between the exit 20 of the transport path in the photosensitive material discharging apparatus 1 and a sorter 19. The loading conveyer 18 is oriented to provide a conveying path 21 substantially perpendicular to a direction A in which the photosensitive material 50 is discharged from the exit 20. Consequently, the sheets of photosensitive material 50 transported in the three-lane, phase-staggered formation are received in different positions on the loading conveyer 18 in the moving direction of the latter. As the sheets of photosensitive material 50 are discharged onto the loading conveyer 18, the latter is driven intermittently by a driving device connected to a pulley, to deliver the sheets to receptacles 22 of the sorter 19 disposed downstream of loading conveyer 18.

This sorter 19 has the receptacles 22 arranged in a plurality of stages for receiving the photosensitive material 50. The receptacles 22 are connected to a vertically movable chain 22a, such that each receptacle 22 assumes a substantially horizontal posture in a position of connection with the loading conveyer 18. When sheets of photosensitive material 50 corresponding to the frames on one length of film are stacked on one receptacle 22, this receptacle 22 is moved downward and a next receptacle 22 is positioned to receive sheets of photosensitive material 50 subsequently delivered by the loading conveyer 18. In this way, the loading conveyer 18 successively receives the sheets of photosensitive material 50, and delivers the sheets to the sorter 19. This sorter 19 receives the photosensitive material 50 corresponding to one order (usually corresponding to one length of photographic film) on one receptacle 22, to sort the photosensitive material 50 order by order.

Details of the sorter 19 will be described briefly with reference to FIG. 4.

This sorter 19 includes a chain driving sprocket 62a mounted on a drive shaft 61 rotatable relative to a sorter frame 60 by a drive mechanism (not shown), and a driven sprocket 62b opposed to the driving sprocket 62a. Thus, as shown, a construction is employed to drive the chain 22a in a circle. Further, the above sprockets 62a and 62b are arranged vertically to provide a circuit for the receptacles 22 which includes vertically extending circuit portions 101.

Figure 4:
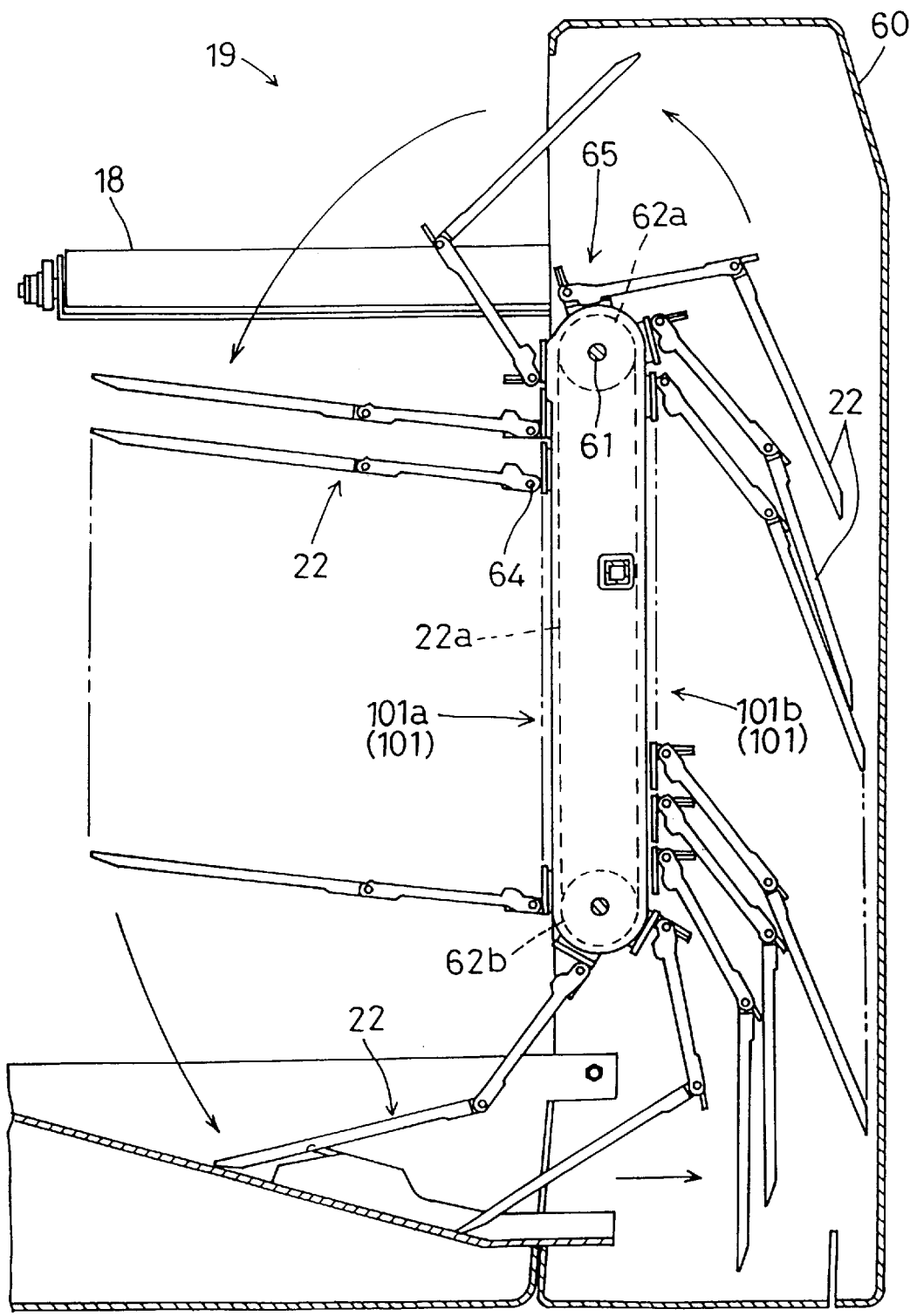
FIG. 4 is a view in vertical section of a sorter.

With this sorter 19, the receptacles 22 are switchable on the circuit of the chain 22a between a projecting posture for receiving objects to be sorted (cf. the posture of receptacles 22 on the vertically extending circuit portions 101a disposed leftward in FIG. 4), and a folded posture having moved close to the chain 22a through a pivotal movement about receptacle support axes 64 (cf. the posture of receptacles 22 on the vertically extending circuit portions 101a disposed rightward in FIG. 4).

Operation of the photosensitive material discharging apparatus 1 will be described next.

It is assumed here that the photosensitive material 50 has a standard width between 89 mm and 6 inches, for example.

As described hereinbefore, the photosensitive material discharging apparatus 1 receives the sheets of photosensitive material 50 transported in the three-lane, phase-staggered formation as shown in FIGS. 2 and 3.

The sheets of photosensitive material 50 are transported to the exit 20 of the transport path by the plurality of transport roller pairs 70a and 70b of the transporting pinch roller mechanism 70 arranged along the transport path and providing substantially the same transporting speed. When the rear ends of the sheets of photosensitive material 50 are released from the final transport roller pair 70a and 70b of transporting pinch roller mechanism 70, the sheets are accelerated to the speed of the first rollers 41 of discharging roller mechanism 40 to be discharged at high speed onto the loading conveyer 18.

The discharged sheets of photosensitive material 50 are transported by the intermittent movement of loading conveyer 18 in a direction perpendicular to the direction of discharge. At this time, the discharging operation and the conveying operation of the loading conveyer 18 to one of the receptacles 22 are repeated to handle, individually, the sheets of photosensitive material 50 transported in the three-lane, phase-staggered formation. That is, while one sheet of photosensitive material 50 is present on the loading conveyer 18, the next sheet is not completely released from the discharging roller mechanism 23. Thus, the sheets of photosensitive material 50 discharged successively are stacked on the receptacle 22 by the intermittent action of loading conveyer 18. In this way, the sheets of photosensitive material 50 may be rearranged and stacked according to the order of the frames of the film.

The operation to discharge the photosensitive material 50 will be described with reference to FIGS. 5A and 5B.

In FIG. 5A, a forward end region of a sheet of photosensitive material 50 is pinched by a first roller 41 and a second roller 43, while a rear end region of the sheet is pinched by a transport roller pair 70a and 70b. Preferably, the first rollers 41 have a peripheral speed 1.1 to 20 times the peripheral speed of the driving transport rollers 70a. The illustrated sheet of photosensitive material 50 is transported at the rotating speed of transport roller 70a, while slippage is occurring with the first roller 41 in high-speed rotation. The sheet of photosensitive material 50 has an emulsion surface thereof facing up, and the slippage occurs on the other surface. Thus, no damage is done to the photo image. In addition, the vertically movable support shaft 45 can absorb any load variations occurring in the slipping state.

In FIG. 5B, the sheet of photosensitive material 50 has been released from the transport roller pair 70a and 70a, and is being discharged at high speed by the first roller 41 and second roller 43.

That is, with this photosensitive material discharging apparatus 1, once the forward end of the sheet of photosensitive material 50 advances into the discharging roller mechanism 40, the first roller 41 of discharging roller mechanism 40 exerts an effort to transport the sheet at its peripheral speed. However, while the rear end of the sheet remains engaged by the transporting pinch roller mechanism 70, the sheet cannot be drawn away from the transporting pinch roller mechanism 70 since the second roller 43 is pressing the sheet only by gravity. As a result, slippage occurs between the sheet of photosensitive material 50 and the first roller 41. The photosensitive material 50 remains being transported at the transporting speed provided by the transporting pinch roller mechanism 70. However, when the sheet of photosensitive material 50 has left the transporting pinch roller mechanism 70, the sheet is accelerated by the discharging roller mechanism 40 to be discharged at high speed from the exit of the transport path. This is possible since only the weight of the second roller 3 is sufficient to apply the transporting force of the first roller 41 to the sheet of photosensitive material 50.

Timing of the intermittent movement of loading conveyer 18 is set based on detections by optical sensors (not shown). Specifically, one of the optical sensors detects the rear end of each sheet of photosensitive material 50 discharged at high speed, and the loading conveyer 18 is driven a predetermined time after passage of the rear end. The loading conveyer 18 is stopped upon detection by the other optical sensor of each sheet transferred to the receptacle 22.

Further, the sheets of photosensitive material 50 having passed are counted based on signals from the optical sensor (not shown) detecting the rear ends of the sheets. A control circuit (not shown) collates the count with one length of film. When all the sheets of photosensitive material 50 corresponding to that film have been accumulated on one receptacle 22, the next receptacle 22 is lowered.

The receptacles 22 may be lowered smoothly, quickly and without impact or bounce by the unique construction described hereinbefore.

What is claimed is:

1. A photosensitive material discharging apparatus for transporting along a transport path and discharging a photosensitive material, comprising:

a discharge section disposed downstream of said transport path for discharging said photosensitive material;

a plurality of transport roller pairs arranged on said transport path upstream of said discharge section; and a discharge roller pair disposed in said discharge section for receiving said photosensitive material transported by said transport roller pairs and discharging said photosensitive material, said discharge roller pairs having a first roller rotatable at a higher peripheral speed than said transport roller pairs, and a second roller disposed to pinch said photosensitive material with said first roller;

wherein said second roller is freely rotatable to cause slippage between said first roller and said photosensitive material when said photosensitive material is pinched by both said transport roller pairs and said discharge roller pair, and to allow said photosensitive material to be transported by drive of said first roller when said photosensitive material is pinched only by said discharge roller pair; and said first and second rollers are disposed with respective rotational axes thereof being displaced relative from each other in a direction of transporting the photosensitive material.

2. A photosensitive material discharging apparatus as defined in claim 1, wherein said first roller is disposed to contact a back surface of said photosensitive material reverse to a front emulsion surface thereof.

3. A photosensitive material discharging apparatus as defined in claim 1, wherein said first roller has a main roller body formed of plastic, and an element of high friction coefficient formed peripherally of said main roller body.

4. A photosensitive material discharging apparatus as defined in claim 1, wherein said second roller is supported by a support shaft vertically movable by a predetermined amount, said second roller contacting said first roller by gravity.

* * * * *